(12) United States Patent
Liao et al.

(10) Patent No.: US 11,693,973 B2
(45) Date of Patent: Jul. 4, 2023

(54) FILE VULNERABILITY DETECTION SYSTEM AND DETECTION METHOD THEREOF

(71) Applicant: INSTITUTE FOR INFORMATION INDUSTRY, Taipei (TW)

(72) Inventors: Jian Wei Liao, Taipei (TW); Chihwei Chen, Taipei (TW); Chin Wei Tien, Taipei (TW); Tsung Ta Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 186 days.

(21) Appl. No.: 17/206,145

(22) Filed: Mar. 19, 2021

(65) Prior Publication Data

US 2022/0269793 A1 Aug. 25, 2022

(30) Foreign Application Priority Data

Feb. 23, 2021 (TW) .................................. 110106304

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC ..... G06F 21/577; G06F 2221/033; G06F 8/53
See application file for complete search history.

(56) References Cited

U.S. PATENT DOCUMENTS

| 10,275,601 B2* | 4/2019 | Smith ................. G06F 11/3604 |
| 2013/0167240 A1* | 6/2013 | Kelekar ................ G06F 21/554 |
| | | 726/25 |
| 2018/0189042 A1* | 7/2018 | Noonan .................... G06F 8/53 |

FOREIGN PATENT DOCUMENTS

| CN | 110990058 B | * | 8/2020 | ............... G06F 8/53 |
| CN | 110990058 B | | 8/2020 | |
| CN | 111639344 A | | 9/2020 | |
| WO | WO-2020252529 A1 | * | 12/2020 | |

* cited by examiner

*Primary Examiner* — Meng Li

(57) ABSTRACT

A file vulnerability detection method includes: translating a binary file into an intermediate file; analyzing the intermediate file to obtain multiple functions to be tested; establishing function characteristic data of each of the functions to be tested; and comparing correlations between the function characteristic data of each of the functions to be tested and at least one pair of characteristic data with vulnerability of at least one vulnerability function and characteristic data without vulnerability of the at least one vulnerability function in a vulnerability database based on a characteristic model to determine whether each of the functions to be tested corresponding to each function characteristic data has a vulnerability, wherein the characteristic model has information representing multiple back-end binary files generated by multiple back-end platforms, wherein the characteristic data with vulnerability has the vulnerability, and the characteristic data without vulnerability does not have the vulnerability.

18 Claims, 5 Drawing Sheets

```
{
"src":"Path to libssl.so.11,
"features":[0,1,10,1,11,0,
11,0.296],[0,1,1,0,2,0,10,
0.362],[...],[...],[...]],
"n_num": 4,
"succs": [[1],[2,3],[4],[],[]],
"fname": "@dtls1_reset_seq_numbers"
}
```

FILE VULNERABILITY DETECTION SYSTEM AND DETECTION METHOD THEREOF

CROSS-REFERENCE TO RELATED APPLICATIONS

This application claims the benefit of priority from the prior Taiwanese Patent Application No. 110106304, filed Feb. 23, 2021, the entire contents of which are incorporated herein by reference.

FIELD OF THE INVENTION

The present invention relates to a file vulnerability detection technology, and more particularly to a file vulnerability detection system and detection method thereof.

BACKGROUND OF THE INVENTION

With the vigorous development of Internet of Things (IoT) device, many software security detection technologies in the firmware of the device have also been proposed. Vulnerability scanning, vulnerability (CVE) detection, etc. for source code all are to solve the vulnerabilities and vulnerabilities in the firmware, but in fact, many manufacturers are unwilling to provide source codes, so the target for detection becomes the version information of the binary file extracted from the firmware, which is easy to cause detection difficulties and misjudgments. Moreover, there are many IoT device platforms. The binary files with vulnerabilities which are established on a single platform characteristic are difficult to apply to other platforms, and the characteristic establishment of multiple platforms takes too much labor and cost. Therefore, how to effectively solve the vulnerability detection of the firmware on the cross-platform is a topic to be solved.

SUMMARY OF THE INVENTION

The present invention provides a file vulnerability detection system and detection method thereof, which can solve the problem that it is difficult to establish common characteristics and then detect vulnerabilities due to the large number of IoT device platforms, so as to achieve the effect of the vulnerability detection of the cross-platform binary files.

The file vulnerability detection method provided by the present invention includes: translating a binary file into an intermediate file; analyzing the intermediate file to obtain multiple functions to be tested; establishing function characteristic data of each of the functions to be tested; and comparing correlations between the function characteristic data of each of the functions to be tested and at least one pair of characteristic data with vulnerability of at least one vulnerability function and characteristic data without vulnerability of the at least one vulnerability function in a vulnerability database based on a characteristic model to determine whether each of the functions to be tested corresponding to each function characteristic data has a vulnerability, wherein the characteristic model has information representing multiple back-end binary files generated by multiple back-end platforms, wherein the characteristic data with vulnerability has the vulnerability, and the characteristic data without vulnerability does not have the vulnerability.

The file vulnerability detection system provided by the present invention includes a memory and a processor connected to the memory. The memory is configured to store multiple instructions and a vulnerability database. The processor is configured to read the multiple instructions to execute the instructions to: translate a binary file into an intermediate file; analyze the intermediate file to obtain multiple functions to be tested; establish function characteristic data of each of the functions to be tested; and compare correlations between the function characteristic data of each of the functions to be tested and at least one pair of characteristic data with vulnerability of at least one vulnerability function and characteristic data without vulnerability of the at least one vulnerability function in a vulnerability database based on a characteristic model to determine whether each of the functions to be tested corresponding to each function characteristic data has a vulnerability, wherein the characteristic model has information representing multiple back-end binary files generated by multiple back-end platforms, wherein the characteristic data with vulnerability has the vulnerability, and the characteristic data without vulnerability does not have the vulnerability.

In an embodiment of the present invention, the back-end platforms include a first back-end platform and a second back-end platform, and the first back-end platform is different from the second back-end platform.

In an embodiment of the present invention, the first back-end platform is one of x86 platform, PowerPC platform, ARM platform and MIPS platform, and the second back-end platform is another of x86 platform, PowerPC platform, ARM platform and MIPS platform.

In an embodiment of the present invention, the back-end binary files include a first back-end binary file and a second back-end binary file, the first back-end binary file is from the first back-end platform, and the second back-end binary file is from the second back-end platform.

In an embodiment of the present invention, the binary file is from another of x86 platform, PowerPC platform, ARM platform and MIPS platform which is different from the first back-end platform and the second back-end platform.

In an embodiment of the present invention, the processor is further configured to: establish an attributed control flow graph (ACFG) of each of the functions to be tested.

In an embodiment of the present invention, the processor is further configured to: when each function characteristic data has a function name, compare each function characteristic data with the characteristic data with vulnerability having the function name in the at least one pair of the at least one vulnerability function by a processor to generate a first similarity; when each function characteristic data has the function name, compare each function characteristic data with the characteristic data without vulnerability having the function name in the at least one pair of the at least one vulnerability function by the processor to generate a second similarity; and determine whether each of the functions to be tested corresponding to each function characteristic data has the vulnerability according to the first similarity and the second similarity.

In an embodiment of the present invention, each of the functions to be tested corresponding to each function characteristic data is determined to have the vulnerability when a value of the first similarity is larger than a value of the second similarity, and each of the functions to be tested corresponding to each function characteristic data is determined to have no vulnerability when the value of the first similarity is smaller than the value of the second similarity.

In an embodiment of the present invention, the processor is further configured to: respectively compare each function characteristic data and each pair of characteristic data with vulnerability and characteristic data without vulnerability in each vulnerability function by a processor to respectively generate each pair of a first similarity and a second similarity; sum up the first similarity and the second similarity in each pair by the processor; and selecting a pair with the highest value in all pairs by the processor to determine whether each of the functions to be tested corresponding to each function characteristic data has the vulnerability.

In an embodiment of the present invention, in the pair with the highest value, each of the functions to be tested corresponding to each function characteristic data is determined to have the vulnerability when a value of the first similarity is larger than a value of the second similarity, and each of the functions to be tested corresponding to each function characteristic data is determined to have no vulnerability when the value of the first similarity is smaller than the value of the second similarity.

Since the file vulnerability detection system and detection method thereof provided by the present invention adopts a cross-platform characteristic model, it can solve the problem that it is difficult to establish common characteristics and then detect vulnerabilities due to the large number of IoT device platforms, so as to achieve the effect of the vulnerability detection of the cross-platform binary files.

In order to make the above and other objects, characteristics, and advantages of the present invention more comprehensible, embodiments are described below in detail with reference to the accompanying drawings, as follows.

DETAILED DESCRIPTION OF PREFERRED EMBODIMENTS

Hereinafter, the present invention will be described in detail with drawings illustrating various embodiments of the present invention. However, the concept of the present invention may be embodied in many different forms and should not be construed as limitative of the exemplary embodiments set forth herein. In addition, the same reference number in the figures can be used to represent the similar elements.

Figure 1:
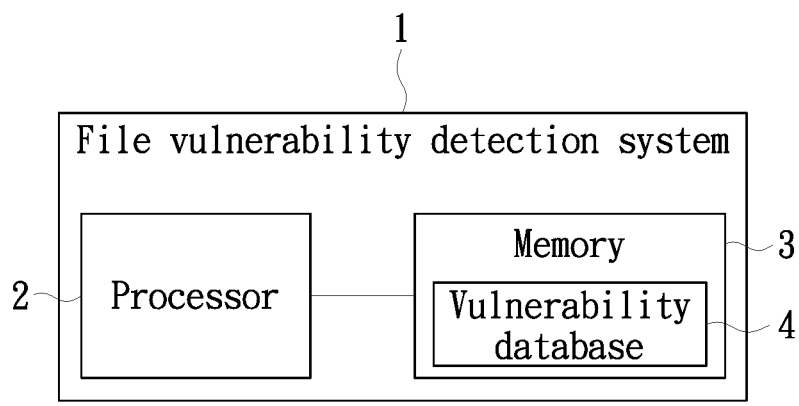
FIG. 1 is a schematic diagram of a file vulnerability detection system provided by an embodiment of the present invention.

Please refer to FIG. 1, the file vulnerability detection system 1 provided by the embodiment of the present invention includes a processor 2 and a memory 3. The processor 2 is connected to the memory 3. The memory 3 is configured to store multiple instructions, and the processor 2 is configured to read the multiple instructions to execute the instructions to perform a file vulnerability detection process. In addition, the memory 3 further includes a vulnerability database 4 to store multiple pairs of characteristic data with vulnerability and characteristic data without vulnerability of multiple vulnerability functions. The use of the vulnerability database 4 will be disclosed in the following paragraphs, so it is omitted herein.

Figures 2, 3:
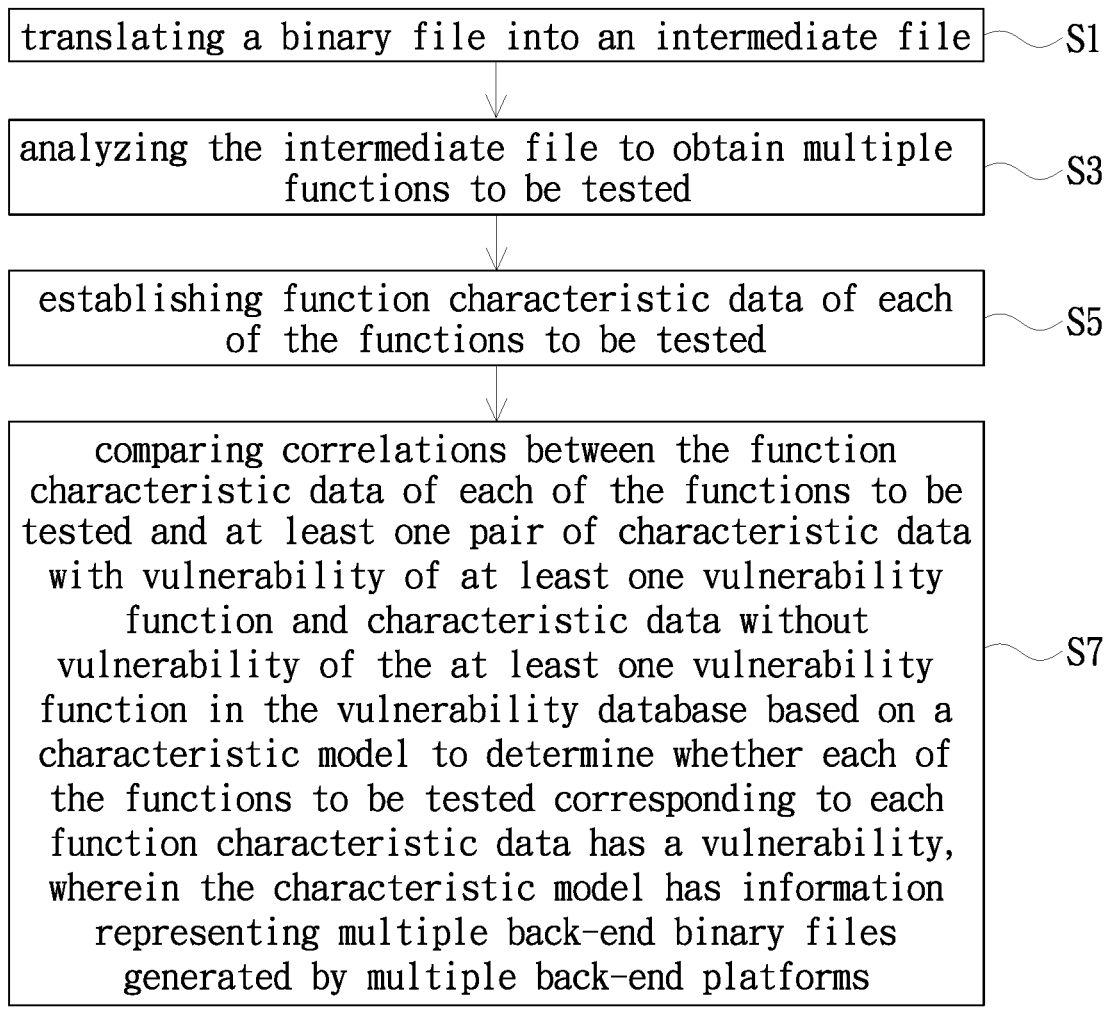
FIG. 2 is a flowchart of a file vulnerability detection method provided by an embodiment of the present invention.
FIG. 3 is a flowchart of establishing function characteristic data of each of the functions to be tested provided by an embodiment of the present invention.

As shown in FIG. 2, the file vulnerability detection method executed by the processor 2 includes step S1: translating a binary file into an intermediate file; step S3: analyzing the intermediate file to obtain multiple functions to be tested; step S5: establishing function characteristic data of each of the functions to be tested; and step S7: comparing correlations between the function characteristic data of each of the functions to be tested and at least one pair of characteristic data with vulnerability of at least one vulnerability function and characteristic data without vulnerability of the at least one vulnerability function in the vulnerability database 4 based on a characteristic model to determine whether each of the functions to be tested corresponding to each function characteristic data has a vulnerability, wherein the characteristic data with vulnerability has the vulnerability, and the characteristic data without vulnerability does not have the vulnerability. The characteristic model is stored in the memory 3 and has information representing multiple back-end binary files generated by multiple back-end platforms. The multiple back-end platforms could at least include platforms such as x86 platform, PowerPC platform, ARM platform, MIPS platform, or other back-end platforms. Exactly, the back-end platforms could at least include a first back-end platform and a second back-end platform, and the first back-end platform is different from the second back-end platform. The back-end binary files include a first back-end binary file and a second back-end binary file, the first back-end binary file is from the first back-end platform, and the second back-end binary file is from the second back-end platform.

In step S1, the binary file is from another of x86 platform, PowerPC platform, ARM platform and MIPS platform which is different from the first back-end platform and the second back-end platform. On the other hand, the binary file is from platform other than x86 platform, PowerPC platform, ARM platform and MIPS platform, etc. The intermediate file is obtained by the processor 2 decompiling the binary file into the low-level virtual machine bitcode file and optimizing and converting the low-level virtual machine bitcode file, and the intermediate file is a low-level virtual machine intermediate language format (LLVM assembly language format). Those skilled in the art should be familiar with the conversion between intermediate language and binary language, so no more details will be given herein.

In step S3, the processor 2 reads and analyzes the intermediate file to record whole domain variables and their types to obtain multiple functions to be tested.

Figures 4, 5:
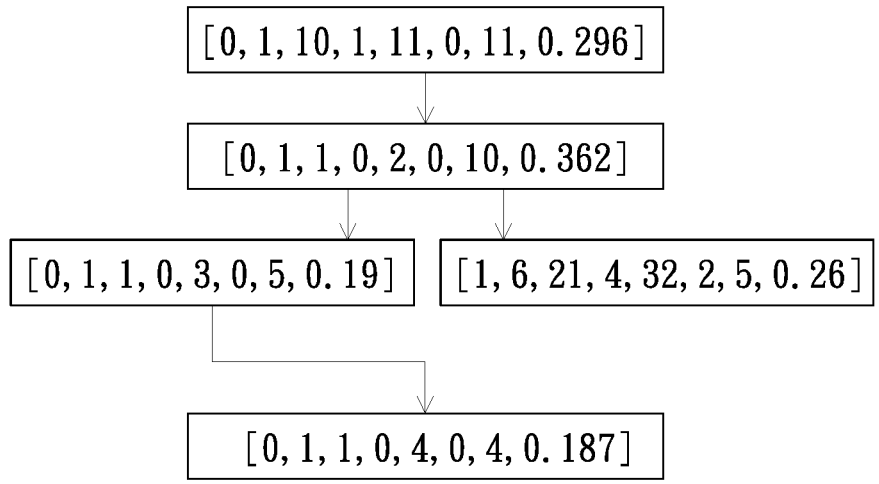
FIG. 4 is a schematic diagram of an attributed control flow graph provided by an embodiment of the present invention.
FIG. 5 is a schematic diagram of function characteristic data provided by an embodiment of the present invention.

In step S5, the processor 2 analyzes multiple functions to be tested according to characteristic items in Table 1 to obtain function characteristic data of each of the functions to be tested, and executes step S51: establishing an attributed control flow graph (ACFG) of each of the functions to be tested, as shown in FIG. 3. The attributed control flow graph is shown in FIG. 4. Then, the processor 2 establishes the function characteristic data as shown in FIG. 5 according to the attributed control flow graph, where "Src" represents a source binary file name, "characteristics" represents characteristic parameters of each node, "n_num" represents the number of nodes of the function to be tested, "succs" represents locations of sub-nodes corresponding to each node, and "fname" represents the function name. It should be noted that FIGS. 4 and 5 are only examples, and the attributed control flow graph and function characteristic data are not used to limit the present invention. Those skilled in the art can analyze the binary file to obtain the function characteristics of each of the functions to be tested according to the characteristic items in Table 1 to establish the attributed control flow graph and function characteristic data.

TABLE 1

| | |
|---|---|
| Intra block | No. Terminator Instructions |
| | No. Binary Operations |
| | No. Bitwise Binary Operations |
| | No. Instr. |
| | No. Vector Operations |
| | No. Aggregate Operations |
| | No. Memory Access and Addressing Operations |
| | No. Conversion Operations |
| | No. LLVM Other Operations |
| | No. Numeric constants |
| | No. String constants |
| | No. Pointer constants |
| | No. Boolean constants |
| | Block level |
| Inter block | No. offspring |

In step S7, it should be noted that the characteristic model is a machine learning model established by collecting the similarities between the characteristic data of each function in multiple back-end binary files. In an example of establishing a characteristic model, the "function name" in the function characteristic data is used to determine the similarity of two functions. When function names of two functions are the same, the similarity of the two functions corresponds to a first label value which is 1. When function names of two functions are not the same, the similarity of the two functions corresponds to a second label value which is −1. Those skilled in the art can establish the required characteristic model based on the function characteristic data, and the present invention is not limited to the above examples.

In addition, in step S7, the vulnerability database 4 includes at least one pair of characteristic data with vulnerability of at least one vulnerability function and characteristic data without vulnerability of the at least one vulnerability function in a plurality of back-end binary files, so as to compare the function characteristic data of each of the functions to be tested and the at least one pair of characteristic data with vulnerability and characteristic data without vulnerability of all vulnerability functions in the vulnerability database 4, and then determine whether each of the functions to be tested has the vulnerability.

Figure 6:
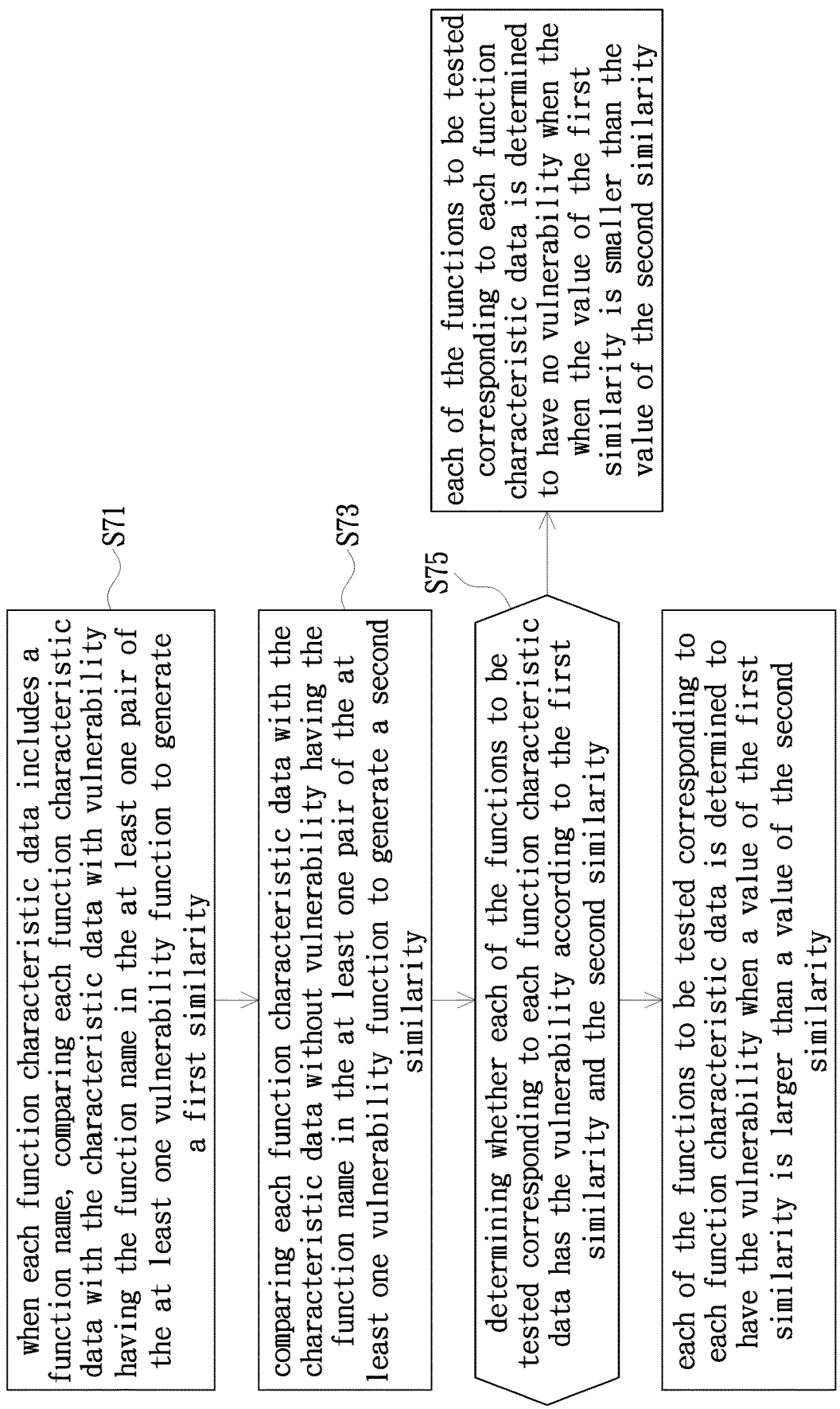
FIG. 6 is a flowchart of determining whether each of the functions to be tested corresponding to each function characteristic data has a vulnerability provided by an embodiment of the present invention.

Further, when each function characteristic data includes a function name, the processor 2 executes step S71: comparing each function characteristic data with the characteristic data with vulnerability having the function name in the at least one pair of the at least one vulnerability function to generate a first similarity; step S73: comparing each function characteristic data with the characteristic data without vulnerability having the function name in the at least one pair of the at least one vulnerability function to generate a second similarity; and step S75: determining whether each of the functions to be tested corresponding to each function characteristic data has the vulnerability according to the first similarity and the second similarity, as shown in FIG. 6. That is, each of the functions to be tested corresponding to each function characteristic data is determined to have the vulnerability when a value of the first similarity is larger than a value of the second similarity, and each of the functions to be tested corresponding to each function characteristic data is determined to have no vulnerability when the value of the first similarity is smaller than the value of the second similarity.

In an example, when the first similarity value between function characteristic data containing a known function name included in a function to be tested and characteristic data with vulnerability having the function name in a pair of a vulnerability function is 0.8, and when the second similarity value between the function characteristic data containing the known function name included in the function to be tested and characteristic data without vulnerability having the function name in the pair of the vulnerability function is 0.9, the processor 2 determines that the function to be tested does not have a vulnerability. Otherwise, the processor 2 determines that the function to be tested has the vulnerability.

Figure 7:
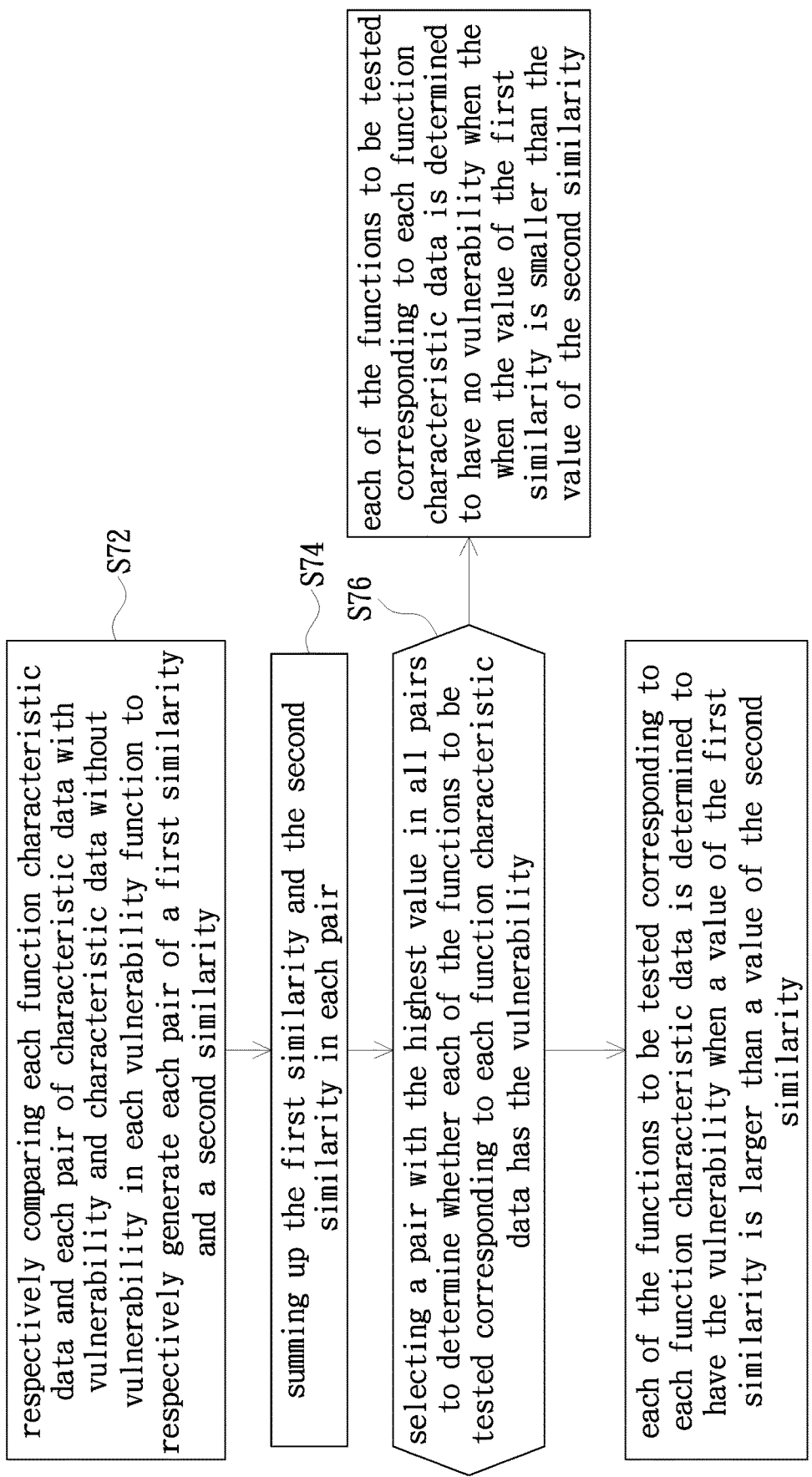
FIG. 7 is a flowchart of determining whether each of the functions to be tested corresponding to each function characteristic data has a vulnerability provided by another embodiment of the present invention.

In another embodiment, when each function characteristic data includes an unknown function name, the processor 2 executes step S72: respectively comparing each function characteristic data and each pair of characteristic data with vulnerability and characteristic data without vulnerability in each vulnerability function to respectively generate each pair of a first similarity and a second similarity; step S74: summing up the first similarity and the second similarity in each pair; and step S76: selecting a pair with the highest value in all pairs to determine whether each of the functions to be tested corresponding to each function characteristic data has the vulnerability, as shown in FIG. 7. That is, in the pair with the highest value, each of the functions to be tested corresponding to each function characteristic data is determined to have the vulnerability when a value of the first similarity is larger than a value of the second similarity, and each of the functions to be tested corresponding to each function characteristic data is determined to have no vulnerability when the value of the first similarity is smaller than the value of the second similarity.

In an example, when the first similarity and the second similarity between function characteristic data containing an unknown function name included in a function to be tested and a pair of characteristic data with vulnerability and characteristic data without vulnerability are 0.8 and 0.9, respectively, when the first similarity and the second similarity between the function characteristic data containing the unknown function name included in the function to be tested and another pair of characteristic data with vulnerability and characteristic data without vulnerability are 0.5 and 0.7, respectively, when the first similarity and the second similarity between the function characteristic data containing the unknown function name included in the function to be tested and another pair of characteristic data with vulnerability and characteristic data without vulnerability are 0.6 and 0.4, respectively, and when the first similarity and the second similarity between the function characteristic data containing the unknown function name included in the function to be tested and the other pair of characteristic data with vulnerability and characteristic data without vulnerability are 0.7 and 0.3, respectively, the processor 2 first sums up the two similarity values in each pair as 1.7, 1.2, 1.0, and 1.0, then selects a pair with the highest value of 1.7, and determines that the function to be tested does not have a vulnerability. Otherwise, the processor 2 determines that the function to be tested has the vulnerability. Furthermore, in addition to the unknown function name, when the file name of the binary file to be tested is also unknown, the processor 2 may not be able to determine whether the vulnerability belongs to the function to be tested. At this time, the processor 2 can determine whether the first similarity and the second similarity after the comparison are valid by using a threshold value, such as 0.8 preferably. When the first similarity and the second similarity of the pair with the highest value do not exceed the threshold value, the processor 2 determines that the file vulnerability detection method is invalid. Otherwise, the processor 2 determines that the file vulnerability detection method is valid.

In addition, another embodiment of the present invention can include a non-transitory computer-readable medium storing a set of instructions to be executed by the processor 2. The non-transitory computer-readable medium can be, for example, memory 3, or can include more than one storage medium including, for example, (fixed, flexible, and removable) magnetic disks and magnetic tapes, optical medium such as CD-ROM and digital video disc (DVD), and semiconductor memory devices such as electronically programmable read-only memory (EPROM) and electronically erasable removable programmable read-only memory (EEPROM).

In summary, by adopting a cross-platform characteristic model, the file vulnerability detection system and detection method thereof provided by the present invention can solve the problem that it is difficult to establish common characteristics and then detect vulnerabilities due to the large number of IoT device platforms, so as to achieve the effect of the vulnerability detection of the cross-platform binary files.

Although the present invention has been disclosed as above with the embodiments, it is not intended to limit the present invention. Those ordinarily skilled in the art may make some modifications and retouching without departing from the spirit and scope of the present invention. Therefore, the protection scope of the present invention shall be determined by the scope of the attached claims.

What is claimed is:

1. A file vulnerability detection method comprising:
    translating a binary file into an intermediate file;
    analyzing the intermediate file to obtain multiple functions to be tested;
    establishing function data of each of the functions to be tested; and
    comparing correlations between the function data of each of the functions to be tested and function data of at least one function having a version with vulnerability and a version without vulnerability in a vulnerability database based on a characteristic model, to determine whether each of the functions to be tested corresponding to each function data has a vulnerability, wherein the characteristic model has information representing multiple back-end binary files generated by multiple back-end platforms;
    wherein when each function data has a function name, a processor compares each function data with the function data having the function name in the at least one function having the version with vulnerability to generate a first similarity; when each function data has the function name, the processor compares each function data with the function data having the function name in the at least one function having the version without vulnerability to generate a second similarity; and the processor determines whether each of the functions to be tested corresponding to each function data has the vulnerability according to the first similarity and the second similarity.

2. The file vulnerability detection method as claimed in claim 1, wherein the back-end platforms comprise a first back-end platform and a second back-end platform, and the first back-end platform is different from the second back-end platform.

3. The file vulnerability detection method as claimed in claim 2, wherein the first back-end platform is one of ×86 platform, PowerPC platform, ARM platform and MIPS platform, and the second back-end platform is another of ×86 platform, PowerPC platform, ARM platform and MIPS platform.

4. The file vulnerability detection method as claimed in claim 2, wherein the back-end binary files comprise a first back-end binary file and a second back-end binary file, the first back-end binary file is from the first back-end platform, and the second back-end binary file is from the second back-end platform.

5. The file vulnerability detection method as claimed in claim 4, wherein the binary file is from another of ×86 platform, PowerPC platform, ARM platform and MIPS platform which is different from the first back-end platform and the second back-end platform.

6. The file vulnerability detection method as claimed in claim 1, wherein the step of establishing function data of each of the functions to be tested further comprises:
    establishing an attributed control flow graph (ACFG) of each of the functions to be tested.

7. The file vulnerability detection method as claimed in claim 1, wherein each of the functions to be tested corresponding to each function data is determined to have the vulnerability when a value of the first similarity is larger than a value of the second similarity, and each of the functions to be tested corresponding to each function data is determined to have no vulnerability when the value of the first similarity is smaller than the value of the second similarity.

8. A file vulnerability detection method comprising:
    translating a binary file into an intermediate file;
    analyzing the intermediate file to obtain multiple functions to be tested;
    establishing function data of each of the functions to be tested; and
    comparing correlations between the function data of each of the functions to be tested and function data of at least one function having a version with vulnerability and a version without vulnerability in a vulnerability database based on a characteristic model, to determine whether each of the functions to be tested corresponding to each function data has a vulnerability, wherein the characteristic model has information representing multiple back-end binary files generated by multiple back-end platforms;
    wherein a processor respectively compares each function data with the function data in each function having the version with vulnerability and the version without vulnerability to respectively generate each pair of a first similarity and a second similarity; the processor sums up the first similarity and the second similarity in each function; and the processor selects a function with the highest value in all functions to determine whether each of the functions to be tested corresponding to each function data has the vulnerability.

9. The file vulnerability detection method as claimed in claim 8, wherein in the function with the highest value, each of the functions to be tested corresponding to each function data is determined to have the vulnerability when a value of the first similarity is larger than a value of the second similarity, and each of the functions to be tested corresponding to each function data is determined to have no vulnerability when the value of the first similarity is smaller than the value of the second similarity.

10. A file vulnerability detection system comprising:
a memory, configured to store multiple instructions and a vulnerability database; and
a processor, connected to the memory and configured to execute the instructions to:
translate a binary file into an intermediate file;
analyze the intermediate file to obtain multiple functions to be tested;
establish function data of each of the functions to be tested; and
compare correlations between the function data of each of the functions to be tested and function data of at least one function having a version with vulnerability and a version without vulnerability in a vulnerability database based on a characteristic model to determine whether each of the functions to be tested corresponding to each function data has a vulnerability, wherein the characteristic model has information representing multiple back-end binary files generated by multiple back-end platforms;
wherein the processor is further configured to:
when each function data has a function name, compare each function data with the function data having the function name in the at least one function having the version with vulnerability by a processor to generate a first similarity;
when each function data has the function name, compare each function data with the function data having the function name in the at least one function having the version without vulnerability by the processor to generate a second similarity; and
determine whether each of the functions to be tested corresponding to each function data has the vulnerability according to the first similarity and the second similarity.

11. The file vulnerability detection system as claimed in claim 10, wherein the back-end platforms comprise a first back-end platform and a second back-end platform, and the first back-end platform is different from the second back-end platform.

12. The file vulnerability detection system as claimed in claim 11, wherein the first back-end platform is one of ×86 platform, PowerPC platform, ARM platform and MIPS platform, and the second back-end platform is another of ×86 platform, PowerPC platform, ARM platform and MIPS platform.

13. The file vulnerability detection system as claimed in claim 11, wherein the back-end binary files comprise a first back-end binary file and a second back-end binary file, the first back-end binary file is from the first back-end platform, and the second back-end binary file is from the second back-end platform.

14. The file vulnerability detection system as claimed in claim 13, wherein the binary file is from another of ×86 platform, PowerPC platform, ARM platform and MIPS platform which is different from the first back-end platform and the second back-end platform.

15. The file vulnerability detection system as claimed in claim 10, wherein the processor is further configured to:
establish an attributed control flow graph (ACFG) of each of the functions to be tested.

16. The file vulnerability detection system as claimed in claim 10, wherein each of the functions to be tested corresponding to each function data is determined to have the vulnerability when a value of the first similarity is larger than a value of the second similarity, and each of the functions to be tested corresponding to each function data is determined to have no vulnerability when the value of the first similarity is smaller than the value of the second similarity.

17. A file vulnerability detection system comprising:
a memory, configured to store multiple instructions and a vulnerability database; and
a processor, connected to the memory and configured to execute the instructions to:
translate a binary file into an intermediate file;
analyze the intermediate file to obtain multiple functions to be tested;
establish function data of each of the functions to be tested; and
compare correlations between the function data of each of the functions to be tested and function data of at least one function having a version with vulnerability and a version without vulnerability in a vulnerability database based on a characteristic model to determine whether each of the functions to be tested corresponding to each function data has a vulnerability, wherein the characteristic model has information representing multiple back-end binary files generated by multiple back-end platforms;
wherein the processor is further configured to:
respectively compare each function data and the function data in each function having the version with vulnerability and the version without vulnerability by a processor to respectively generate each pair of a first similarity and a second similarity;
sum up the first similarity and the second similarity in each function by the processor; and
select a function with the highest value in all functions by the processor to determine whether each of the functions to be tested corresponding to each function data has the vulnerability.

18. The file vulnerability detection system as claimed in claim 17, wherein in the function with the highest value, each of the functions to be tested corresponding to each function data is determined to have the vulnerability when a value of the first similarity is larger than a value of the second similarity, and each of the functions to be tested corresponding to each function data is determined to have no vulnerability when the value of the first similarity is smaller than the value of the second similarity.

* * * * *